(12) United States Patent
Sato et al.

(10) Patent No.: US 7,591,182 B2
(45) Date of Patent: Sep. 22, 2009

(54) ULTRASONIC SENSOR MOUNTING STRUCTURE

(75) Inventors: Yoshihisa Sato, Nagoya (JP); Muneaki Matsumoto, Okazaki (JP)

(73) Assignee: DENSO Corporation, Kariya (JP)

( * ) Notice: Subject to any disclaimer, the term of this patent is extended or adjusted under 35 U.S.C. 154(b) by 298 days.

(21) Appl. No.: 11/525,217

(22) Filed: Sep. 22, 2006

(65) Prior Publication Data

US 2007/0062292 A1    Mar. 22, 2007

(30) Foreign Application Priority Data

Sep. 22, 2005 (JP) .............................. 2005-276351
Jul. 21, 2006 (JP) .............................. 2006-199794

(51) Int. Cl.
G01N 29/00 (2006.01)
(52) U.S. Cl. ........................... 73/649; 73/632; 73/866.5
(58) Field of Classification Search .................. 73/649, 73/632, 866.5; 293/117; 340/435, 436
See application file for complete search history.

(56) References Cited

U.S. PATENT DOCUMENTS

| 6,085,592 | A  | * | 7/2000  | Kawashima ................ 73/632 |
| 6,318,774 | B1 | * | 11/2001 | Karr et al. .................. 293/117 |
| 6,759,950 | B2 | * | 7/2004  | Nishimoto et al. ........... 340/436 |
| 7,240,555 | B2 | * | 7/2007  | Kawashima ................ 73/632 |
| 7,357,431 | B2 | * | 4/2008  | Sato et al. .................. 293/117 |
| 7,398,687 | B2 | * | 7/2008  | Nakajima et al. ............ 73/661 |
| 2008/0087090 | A1 | * | 4/2008 | Watanabe et al. ............ 73/597 |

FOREIGN PATENT DOCUMENTS

| DE | 3823477 A1 | 1/1990 |
| EP | 0 881 624 B1 | 4/2003 |
| GB | 2272819 A | 5/1994 |
| JP | 62-240890 | 10/1987 |
| JP | 7-203573 | 8/1995 |
| JP | 2004-264264 | 9/2004 |
| JP | 2005-35315 | 2/2005 |
| JP | 2005-130040 | 5/2005 |
| JP | 2007251534 | * 9/2007 |
| WO | 95/02237 | 1/1995 |

OTHER PUBLICATIONS

Examination Report dated Nov. 14, 2007 in DE Application No. 102006044656.9-35 with English translation.
Office Action issued on May 8, 2009 in corresponding Chinese Application No. 200610139528.2 with an at least partial English language translation thereof.

* cited by examiner

*Primary Examiner*—Hezron Williams
*Assistant Examiner*—J M Saint Surin
(74) *Attorney, Agent, or Firm*—Nixon & Vanderhye P.C.

(57) ABSTRACT

An ultrasonic sensor mounting structure includes an ultrasonic sensor and a wall member to which the ultrasonic sensor is mounted. The ultrasonic sensor includes an ultrasonic transducer and a vibrating surface. An inner surface of the wall member has a fixation portion where the ultrasonic sensor is fixed, a touch portion where the ultrasonic transducer touches, and a location mark portion that indicates location of the fixation portion. An outer surface of the wall member has a vibration portion as the vibrating surface of the ultrasonic sensor. The vibration portion is positioned opposite to the touch portion. The ultrasonic sensor can be accurately mounted in a desired location on the wall member without a reduction in a sensor characteristic, because the location mark portion does not overlap the touch portion.

17 Claims, 8 Drawing Sheets

ULTRASONIC SENSOR MOUNTING STRUCTURE

CROSS REFERENCE TO RELATED APPLICATION

This application is based on and incorporates herein by reference Japanese Patent Applications No. 2005-276351 filed on Sep. 22, 2005 and No. 2006-199794 filed on Jul. 21, 2006.

FIELD OF THE INVENTION

The present invention relates to a structure for mounting an ultrasonic sensor to, for example, a bumper of a vehicle.

BACKGROUND OF THE INVENTION

An ultrasonic sensor for use in a vehicle is generally mounted to a front/rear bumper of the vehicle. For example, an ultrasonic sensor disclosed in JP-2004-264264A is mounted to an inner wall of the bumper in such a manner that a vibrating surface of the ultrasonic sensor is exposed to an outside environment through a hole that penetrates through the bumper. The hole acts as a mounting location mark that indicates a mounting location of the ultrasonic sensor. Thus, the ultrasonic sensor is mounted in a correct location on the bumper. However, the bumper has a bad look due to the hole. Further, since the ultrasonic sensor is partly exposed to the outside environment through the hole, the ultrasonic sensor is easily damaged by gravel, water, and the like. Therefore, the ultrasonic sensor may have less reliability and a short life.

An ultrasonic sensor disclosed in WO9502237A1, corresponding to JP-3469243, is mounted to the inner wall of the bumper and uses a portion of the bumper as a vibrating surface. Thus, the ultrasonic sensor is invisible from the outer side of the bumper so that the bumper has a good look. However, since the bumper has no hole acting as the mounting location mark, the ultrasonic sensor may be mounted in an incorrect location on the bumper. This may result in a detection area variation, a sensor characteristic variation, a directivity variation, and a fixation reliability reduction. If the mounting location mark is formed on the inner wall of the bumper, the ultrasonic sensor may be mounted in the correct location on the bumper by using the mounting location mark as a reference. However, since the ultrasonic sensor uses the portion of the bumper as the vibrating surface, the mounting location mark may affect the sensor characteristic.

SUMMARY OF THE INVENTION

In view of the above-described problem, it is an object of the present invention to provide an ultrasonic sensor mounting structure in which an ultrasonic sensor is mounted in a desired location on a wall member without a reduction in a sensor characteristic.

An ultrasonic sensor mounting structure includes an ultrasonic sensor and a wall member such as a vehicle bumper to which the ultrasonic sensor is mounted. The ultrasonic sensor includes an ultrasonic transducer for generating a vibration and a vibrating surface for emitting the vibration. The wall member includes an inner surface and an outer surface. The inner surface has a fixation portion where the ultrasonic sensor is fixed, a touch portion where the ultrasonic transducer directly or indirectly touches so that the vibration generated by the ultrasonic transducer is transmitted to the touch portion, and a location mark portion that indicates location of the fixing surface portion. The outer surface has a vibration portion as the vibrating surface of the ultrasonic sensor. The vibration portion is positioned opposite to the touch portion of the inner surface so that the vibration can be transmitted between the touch portion and the vibration portion.

The location mark portion allows the ultrasonic sensor to be accurately mounted in a desired location on the wall member. The location mark portion is separated from i.e., does not overlap the touch portion so that a reduction in a sensor characteristic can be prevented.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1A:
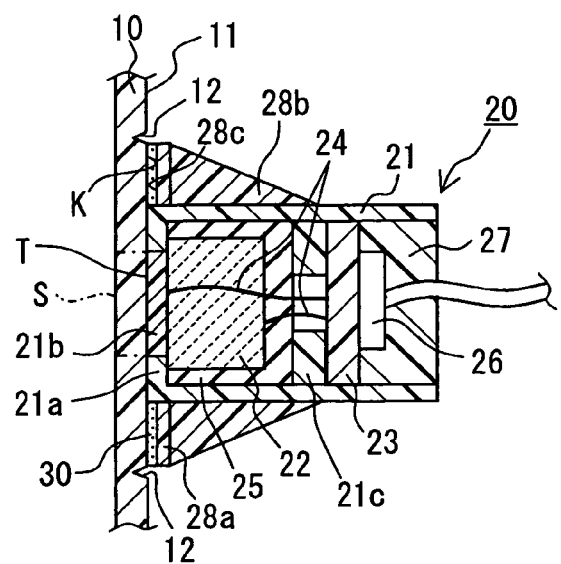
FIG. 1A is a vertical cross-sectional view of an ultrasonic sensor mounting structure according to a first embodiment of the present invention.
Figure 1B:
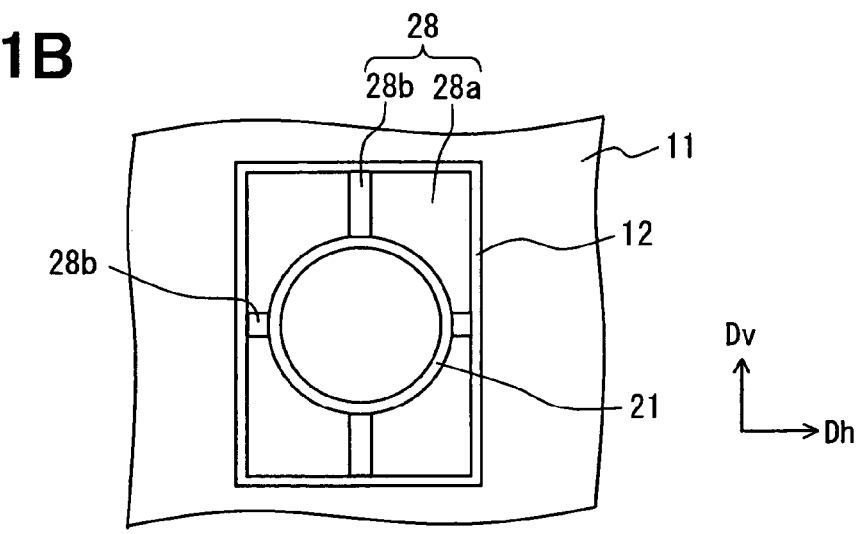
FIG. 1B is a view of the mounting structure of FIG. 1A from an inner side of a wall member.
Figure 1C:
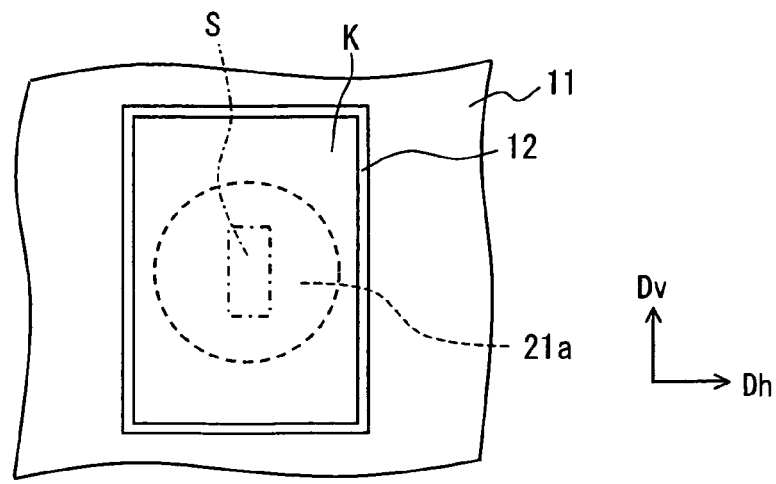
FIG. 1C is a view of the wall member from the inner side.

As shown in FIGS. 1A-1C, the ultrasonic sensor 20 includes a cylindrical body 21 with a bottom wall 21a, an ultrasonic transducer 22, and a circuit board 23 having a processing circuit that calculates a distance from the ultrasonic sensor 20 to an object based on an ultrasonic vibration (wave) emitted and received by the ultrasonic transducer 22. The ultrasonic sensor 20 is mounted to an inner surface 11 of a wall member 10 and uses a portion of an outer surface of the wall member 10 as a vibrating surface S. The wall member 10 may be, for example, a vehicle bumper made of synthetic resin.

The ultrasonic transducer 22 is made of piezoceramic and attached to the bottom wall 21a of the body 21. The piezoceramic is made by compressing and firing metal oxide powder such as barium titanate powder. Since the ultrasonic transducer 22 not only emits the ultrasonic vibration but also receives the ultrasonic vibration, the ultrasonic sensor 20 does not need two ultrasonic transducers 22. Therefore, the ultrasonic sensor 20 has a small size and a detection apparatus employing the ultrasonic sensor 20 can be reduced in size.

The body 21 is made of, for example, synthetic resin and houses the ultrasonic transducer 22 and the circuit board 23. The bottom wall 21a of the body 21 has a vibration transmission portion 21b in the center thereof. The vibration transmission portion 21b touches both the ultrasonic transducer 22 and a touch portion T of the inner surface 11. As shown in FIG. 1A, the touch portion T is positioned opposite to the vibrating surface S.

The vibration transmission portion 21b is made of a different material from the rest of the body 21. For example, the vibration transmission portion 21b is made of a different type of resin from the rest of the body 21. For another example, while the vibration transmission portion 21b is made of the same type of resin as the rest of the body 21, the vibration transmission portion 21b or the rest of the body 21 includes a glass cloth.

The material and shape of the vibration transmission portion 21b is selected such that the ultrasonic sensor 20 is directional in a predetermined direction and has an acoustic impedance intermediate between acoustic impedances of the ultrasonic transducer 22 and the wall member 10.

When the ultrasonic vibration passes through two members having different acoustic impedances, the ultrasonic vibration is partly reflected at the interface between the two members. The amount of the reflected ultrasonic vibration increases with an increase in the difference in the acoustic impedance between the two members. As described above, the vibration transmission portion 21b has the acoustic impedance intermediate between the acoustic impedances of the ultrasonic transducer 22 and the wall member 10. Thus, the amount of the ultrasonic vibration reflected at the interfaces between the ultrasonic transducer 22 and the vibration transmission portion 21b and between the vibration transmission portion 21b and the wall member 10 is effectively reduced. The amount of the ultrasonic vibration passing through the wall member 10 and the vibration transmission portion 21b increases accordingly.

Since the ultrasonic transducer 22 is fixed to the body 21 and the body 21 is mounted to the wall member 10, the body 21 needs adequate stiffness. It is difficult to select the material for the body 21 to meet not only adequate transmission of the ultrasonic vibration but also the adequate stiffness. Therefore, the acoustic impedance of the bottom wall 21a except the vibration transmission portion 21b may be outside a range between the acoustic impedances of the ultrasonic transducer 22 and the wall member 10. Even if the acoustic impedance of the bottom wall 21a except the vibration transmission portion 21b is within the range, the acoustic impedance of the bottom wall 21a except the vibration transmission portion 21b may be close to one of the acoustic impedances of the ultrasonic transducer 22 and the wall member 10, i.e., the bottom wall 21a except the vibration transmission portion 21b may not have the acoustic impedance intermediate between the acoustic impedances of the ultrasonic transducer 22 and the wall member 10.

Therefore, the amount of ultrasonic vibration reflected at the bottom wall 21a except the vibration transmission portion 21b is large, as compared to the vibration transmission portion 21b. Accordingly, the amount of the ultrasonic vibration passing through the bottom wall 21a except the vibration transmission portion 21b is small, as compared to the vibration transmission portion 21b.

Thus, the ultrasonic vibration emitted and received by the ultrasonic transducer 22 is mainly transmitted through the vibration transmission portion 21b in the bottom wall 21a. Therefore, the ultrasonic vibration is mainly transmitted to the vibrating surface S, i.e., the transmission of the vibration is limited within the vibration surface S. Thus, a variation in directivity can be prevented so that desired directivity can be obtained.

The vibration transmission portion 21b has a shape of a rectangle with long sides extending vertically. Since the ultrasonic sensor 20 uses the portion of the outer surface of the wall member 10 as the vibrating surface S, the ultrasonic sensor 20 is invisible from the outer side of the wall member 10.

The ultrasonic transducer 22 except one surface facing the bottom wall 21a is surrounded by a vibration absorber 25 made of an elastic material such as silicon rubber or polyurethane. The vibration absorber 25 prevents the vibration generated by the ultrasonic transducer 22 from being transmitted to other parts of the body 21 than the bottom wall 21a. The circuit board 23 and the vibration absorber 25 are fixed inside the body 21 by a stopper 21c.

The circuit board 23 is connected to the ultrasonic transducer 22 through a lead wire 24. As described above, the circuit board 23 has the processing circuit for calculating the distance from the ultrasonic sensor 20 to the object. When the processing circuit outputs a drive signal to the ultrasonic transducer 22, the ultrasonic transducer 22 vibrates and emits the ultrasonic vibration. When the ultrasonic transducer 22 receives the ultrasonic vibration reflected by the object, the ultrasonic transducer 22 is deformed, generates a voltage signal by piezoelectric effect, and outputs a voltage signal to the processing circuit. The processing circuit calculates the distance, for example, based on a period of time between emission and reception of the ultrasonic vibration. The circuit board 23 is connected to, for example, a control section (not shown) through a connector 26. The control section is mounted inside the vehicle and performs a warning process based on the calculated distance. The body 21 is tightly sealed with a sealant 27.

The wall member 10 is provided with a recessed line 12 that has a predetermined depth and forms a rectangular loop.

The inner edge of the recessed line 12 defines a fixation portion K where the ultrasonic sensor 20 is fixed to the wall member 10.

The body 21 is provided with a mounting member 28 by which the body 21 is fixed to the wall member 10. The mounting member 28 includes a flat base portion 28a and reinforcing portions 28b. The base portion 28a is integrally provided around the body 21 and has a fixing surface 28c facing the inner surface 11 of the wall member 10. The reinforcing portions 28b are integrally provided with the outer surface of the body 21 to reinforce the base portion 28a. As shown in FIG. 1B, two reinforcing portions 28b are positioned vertically and two reinforcing portions 28b are positioned horizontally. In FIGS. 1B and 1C, an arrow Dv represents a vertical direction and an arrow Dh represents a horizontal direction.

When the ultrasonic sensor 20 is mounted to the vehicle, the ultrasonic sensor 20 needs to be directional in a horizontal direction. The base portion 28a have a rectangular shape such that the base portion 28a does not have 90-degree rotational symmetry. In such an approach, even if a vertical directivity of the ultrasonic sensor 20 is different from a horizontal directivity of the ultrasonic sensor 20, the ultrasonic sensor 20 can be mounted to the wall member 10 in correct orientation. Thus, the ultrasonic sensor 20 can be directional in the horizontal direction.

The fixing surface 28c of the base portion 28a is bonded to the fixation portion K of the inner surface 11 through an adhesive member 30 such as a two-sided tape.

Procedures for mounting the ultrasonic sensor 20 to the wall member 10 are described below.

First, the recessed line 12 is formed on the inner surface 11 of the wall member 10, for example, with reference to the edge of the wall member 10. Alternatively, the recessed line 12 may be formed while the wall member 10 is formed.

Second, the adhesive member 30 is applied to the fixing surface 28c of the mounting member 28. Then, the ultrasonic sensor 20 is fixed to the inner surface 11 of the wall member 10 to exactly fit within the fixation portion K defined by the inner edge of the recessed line 12. Thus, the ultrasonic sensor 20 can be accurately fixed to a desired mounting location on the wall member 10. Since the recessed line 12 does not overlap the touch portion T positioned opposite to the vibrating surface S, the recessed line 12 does not affect characteristics of the ultrasonic sensor 20.

The recessed line 12 is viewed even after the ultrasonic sensor 20 is fixed to the wall member 10. Therefore, the ultrasonic sensor 20 can be fixed to the wall member 10 while the recessed line 12 is viewed. Thus, misalignment of the ultrasonic sensor 20 can be prevented so that variations in characteristics of the ultrasonic sensor 20 can be reduced.

If the ultrasonic sensor 20 is fixed to the wall member 10 on the recessed line 12 through the two-sided tape as the adhesive member 30, there is a space between the two-sided tape and the wall member 10 at the recessed line 12. Accordingly, an area through which the ultrasonic sensor 20 and the wall member 10 are fixed is reduced. As a result, fixation between the ultrasonic sensor 20 and the wall member 10 becomes unreliable. In this embodiment, as described above, the fixing surface 28c of the base portion 28a is bonded to the fixation portion K of the inner surface 11 through the two-sided tape. Since the fixation portion K is defined by the inner edge of the recessed line 12, the two-sided tape isn't on the recessed line 12. Thus, the ultrasonic sensor 20 can be securely fixed to the wall member 10 through the adhesive member 30.

As described above, the recessed line 12 has the function that allows the ultrasonic sensor 20 to be accurately mounted to the desired mounting location on the wall member 10. Further, the recessed line 12 has another function that reduces an unwanted vibration transmitted from one ultrasonic sensor 20 to the other.

Figure 3A:
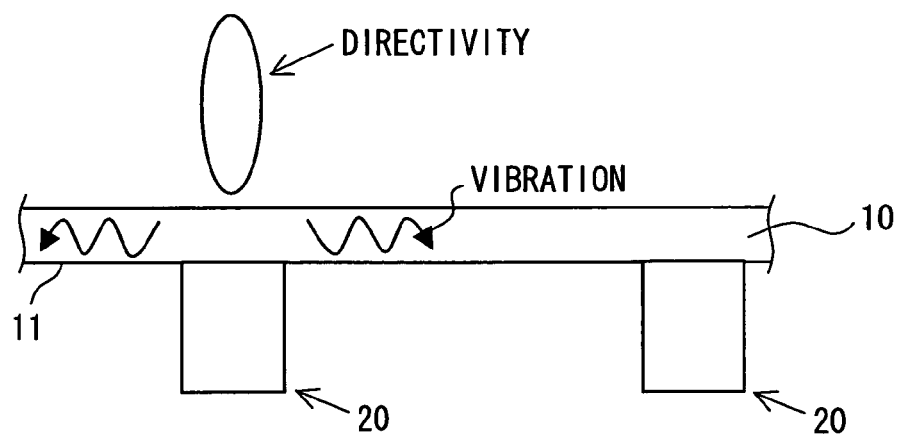
FIG. 3A is a view showing an unwanted vibration and directivity in a mounting structure having no recessed line.

Two or more ultrasonic sensors 20 may be mounted to the wall member 10. In this case, if the wall member 10 has no recessed line 12, the unwanted vibration emitted from one ultrasonic sensor 20 may be directly transmitted to the other, as shown in FIG. 3A. The unwanted vibration may cause a reduction in sensitivity and a variation in directivity of the ultrasonic sensors 20.

Figure 2:
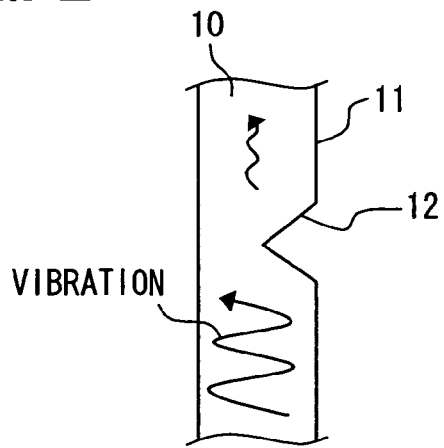
FIG. 2 is a view showing a vibration reduction effect of a recessed line of FIG. 1A.
Figure 3B:
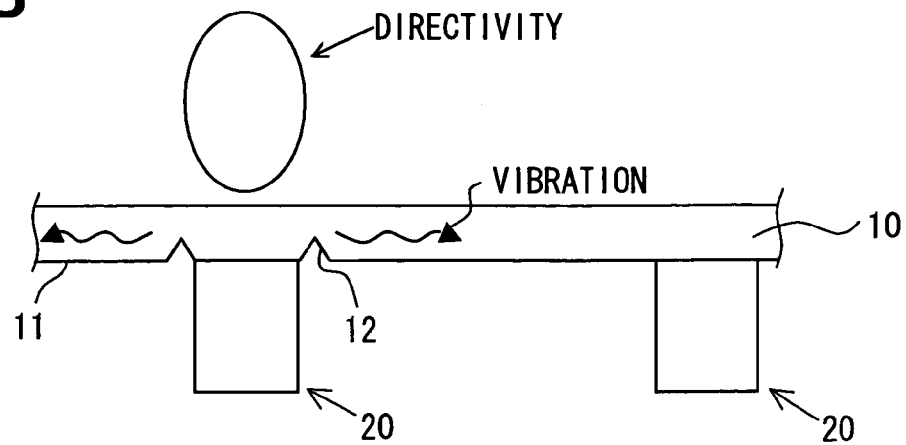
FIG. 3B is a view showing the unwanted vibration and directivity in the mounting structure of FIG. 1A.

In this embodiment, since the wall member 10 has the recessed line 12, the wall member 10 is thinner at the recessed line 12. In the wall member 10, therefore, a recessed line portion containing the recessed line 12 has less thickness than a vibrating surface portion containing the vibrating surface S. As a result, the recessed line portion has less stiffness than the vibrating surface portion. Due to the difference in the stiffness, the vibration coming from the vibrating surface S is damped at the recessed line 12, as shown in FIGS. 2 and 3B.

Further, since the vibrating surface S (the touch portion T) is located inside an area enclosed by the recessed line 12, the vibration is trapped in the area. In such an approach, the recessed line 12 effectively reduces the vibration transmitted from one ultrasonic sensor 20 to the other so that the reduction in sensitivity and the variation in directivity can be reduce, as shown in FIG. 3B. Thus, the recessed line 12 can act as not only a mounting location mark but also a vibration dumper.

Furthermore, the vibration is partly reduced at the fixation portion K bonded to the fixing surface 28c before reaching the recessed line 12. Therefore, the vibration is effectively trapped in the area enclosed by the recessed line 12.

The recessed line 12 have the rectangular loop shape and the vibrating surface S has the rectangular shape. In other words, the recessed line 12 and the vibrating surface S have the same shape. Consequently, a vibration mode corresponding to the shape of the vibrating surface S can be obtained. Alternatively, the recessed line 12 and the vibrating surface S may have a different shape.

Figure 4:
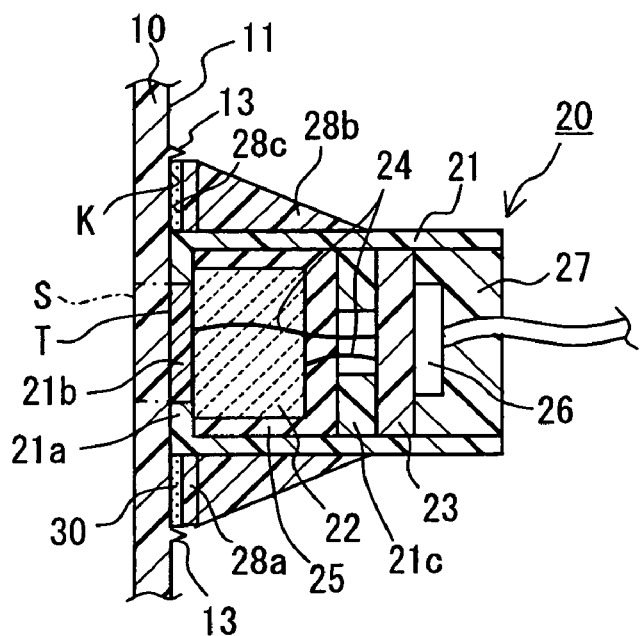
FIG. 4 is a vertical cross-sectional view of an ultrasonic sensor mounting structure according to a modification of the first embodiment.

The wall member 10 may have a projecting line 13 instead of the recessed line 12, as shown in FIG. 4 corresponding to FIG. 1A. The wall member 10 is thicker at the projecting line 13, because the projecting line 13 projects from the inner surface 11. In the wall member 10, therefore, a projecting line portion containing the projecting line 13 has greater thickness than the vibrating surface portion. As a result, the projecting line portion has greater stiffness than the vibrating surface portion. Due to the difference in the stiffness, the vibration coming from the vibrating surface S is damped at the projecting line 13. Thus, the projecting line 13 can act as not only the mounting location mark but also the vibration dumper. The projecting line 13 may be unitary with or fixedly provided on the wall member 10 by a printing method, for example.

Figure 5:
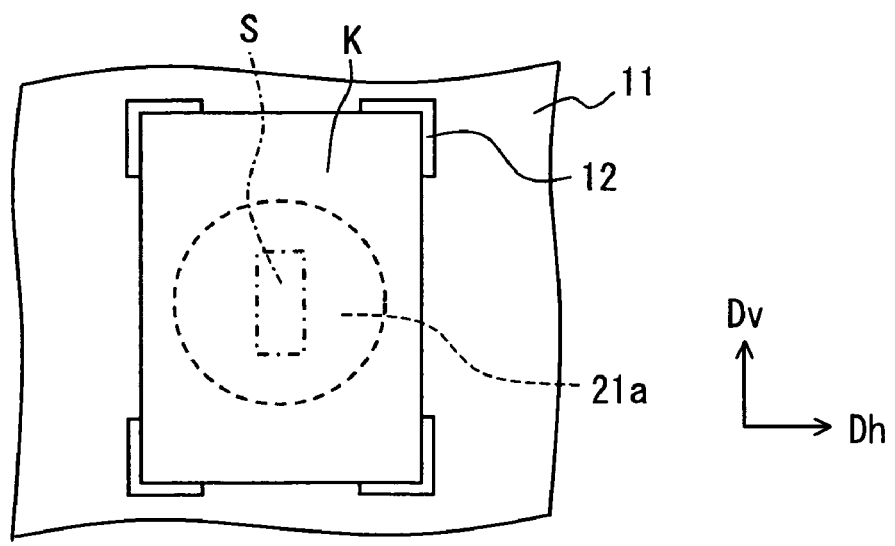
FIG. 5 is a view of a wall member according to another modification of the first embodiment from an inner side of a wall member.

The recessed line 12 and the projecting line 13 can have various shapes and sizes, as long as the recessed line 12 and the projecting line 13 can act as the mounting location mark. For example, the recessed line 12 may be provided only at corners of the fixation portion K, as shown in FIG. 5. By coloring the recessed line 12 and the projecting line 13, the recessed line 12 and the projecting line 13 can act as the mounting location mark more effectively.

As described above, the mounting member 28 of the ultrasonic sensor 20 has the rectangular shape such that the ultrasonic sensor 20 does not have the 90-degree rotational symmetry. The recessed line 12 also has the rectangular shape. Thus, even if the horizontal directivity of the ultrasonic sensor 20 is different from the vertical directivity of the ultrasonic sensor 20, the ultrasonic sensor 20 can be mounted to the wall member 10 in correct orientation so that the ultrasonic sensor 20 can be directional in the desired direction.

Figure 6A:
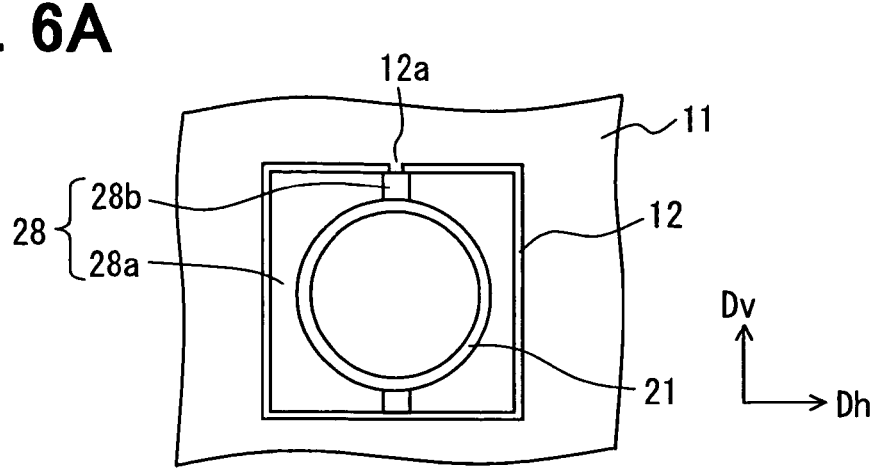
FIG. 6A is a view of an ultrasonic sensor mounting structure according to another modification of the first embodiment from an inner side of a wall member.
Figure 6B:
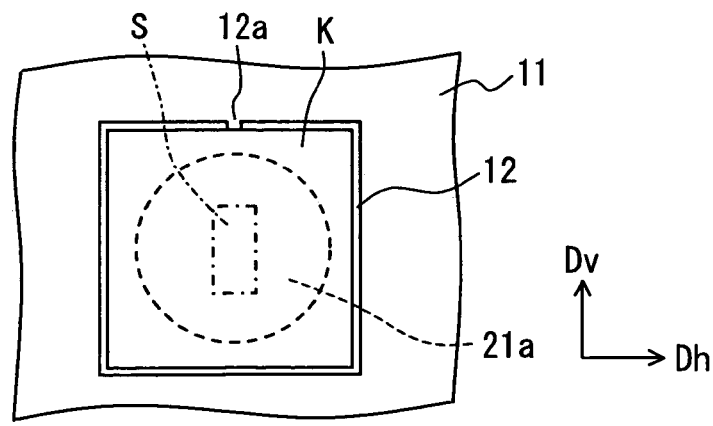
FIG. 6B is a view of the wall member from the inner side.
Figure 7:
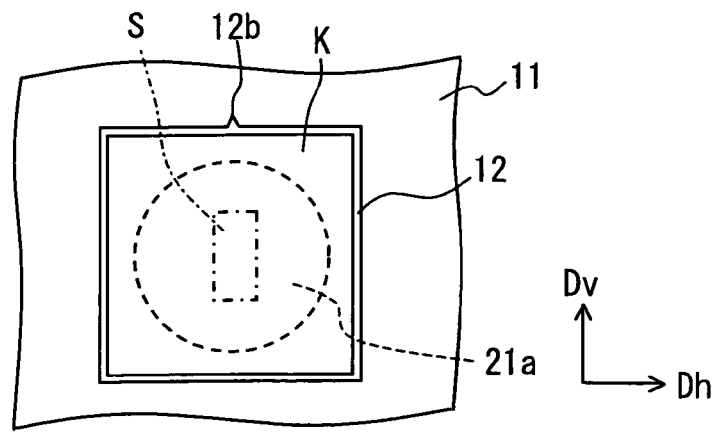
FIG. 7 is a view of a wall member according to another modification of the first embodiment.

Alternatively, the mounting member 28 may have a shape that causes the ultrasonic sensor 20 to have the 90-degree rotational symmetry. For example, the mounting member 28 of the ultrasonic sensor 20 has a square shape. In this case, as shown in FIGS. 6A-7, the ultrasonic sensor may have two reinforcing portions 28b positioned vertically and the recessed line 12 may have a gap portion 12a or a protruding portion 12b. The protruding portion 12b may be unitary with or separated from the recessed line 12. The ultrasonic sensor 20 can be mounted to the wall member 10 in the correct orientation by aligning the gap portion 12a or the protruding portion 12b with one of the reinforcing portions 28b. Thus, the ultrasonic sensor 20 can be directional in the desired direction.

Second Embodiment

Figure 8A:
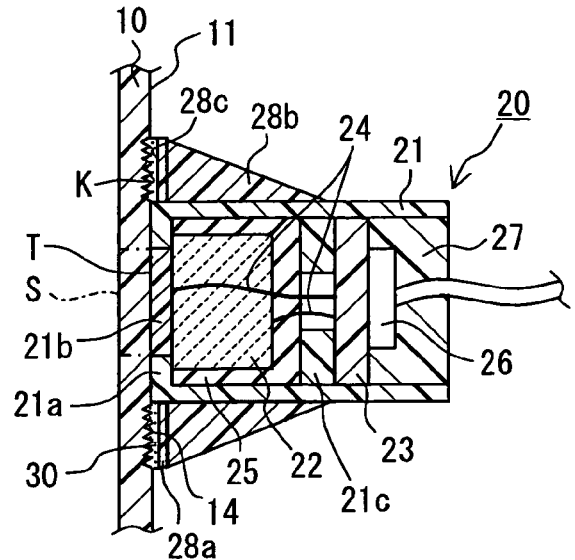
FIG. 8A is a vertical cross-sectional view of an ultrasonic sensor mounting structure according to a second embodiment of the present invention.
Figure 8B:
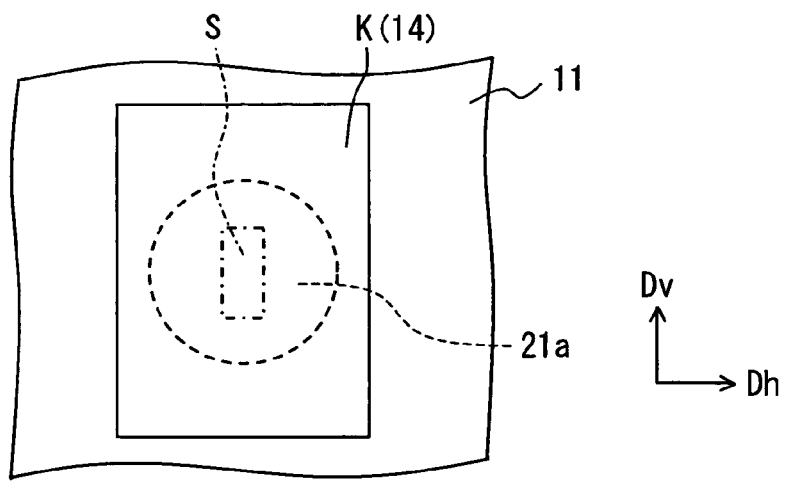
FIG. 8B is a view of a wall member from an inner side.

In the second embodiment shown in FIGS. 8A and 8B, a wall member 10 includes an uneven portion 14 instead of or in addition to the recessed line 12. The uneven portion 14 is partially or wholly provided on the fixation portion K. Thus, the uneven portion 14 can act as the mounting location mark when the ultrasonic sensor 20 is mounted to the wall member 10.

The fixing surface 28c of the ultrasonic sensor 20 is bonded to the fixation portion K by an adhesive member 30 that is a liquid adhesive such as an ultraviolet curing adhesive. Since the uneven portion 14 is provided all over the fixation portion K, the adhesive member 30 penetrates into small gaps on the fixation portion K. As a result, the bonding area between the fixing surface 28c and the fixation portion K is increased so that an anchor effect can be obtained. Thus, the ultrasonic sensor 20 can be securely mounted to the wall member 10.

In the wall member 10, a fixing surface potion containing the fixation portion K has less thickness than the vibrating surface portion containing the vibrating surface S. As a result, the fixing surface portion has less stiffness than the vibrating surface portion. Due to the difference in the stiffness, the vibration coming from the vibrating surface S is damped at the fixation portion K. Further, since the vibrating surface S (the touch portion T) is located inside the area enclosed by the fixation portion K, the vibration is trapped in the area. Furthermore, since the fixation portion K is positioned close to the touch portion T, the vibration is easily reduced. In such an approach, the fixation portion K effectively reduces the vibration transmitted from one ultrasonic sensor 20 to the other so that the reduction in sensitivity and the variation in directivity can be reduced.

Thus, the fixation portion K having the uneven portion 14 can act as not only the mounting location mark but also the vibration dumper. Further, the ultrasonic sensor 20 can be securely fixed to the wall member 10 due to the anchor effect.

Third Embodiment

Figure 9A:
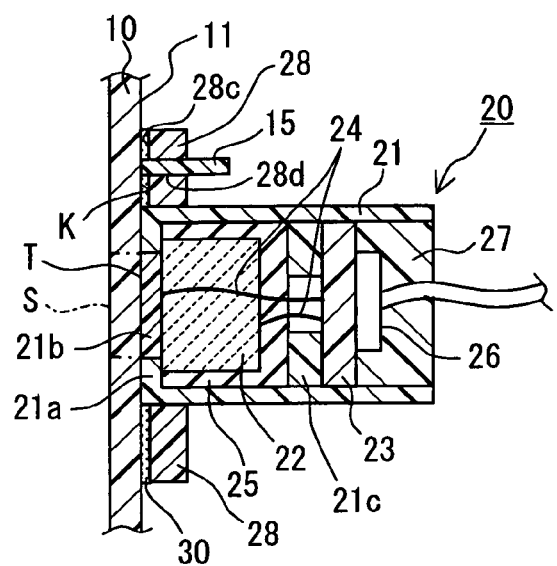
FIG. 9A is a vertical cross-sectional view of an ultrasonic sensor mounting structure according to a third embodiment of the present invention.
Figure 9B:
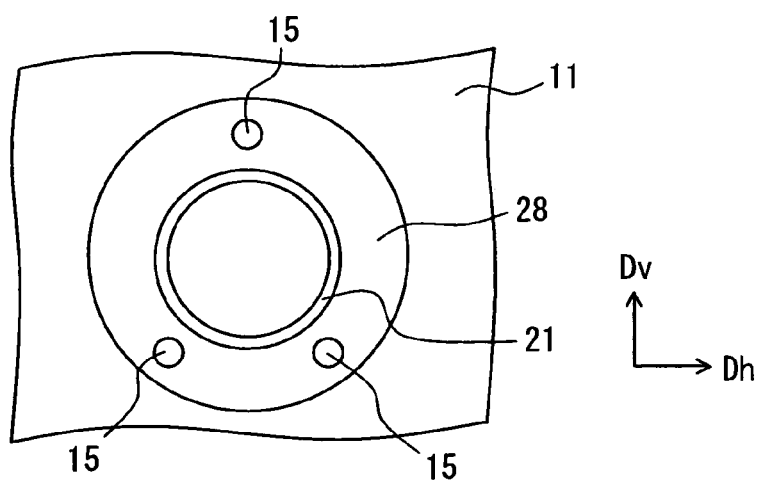
FIG. 9B is a view of the mounting structure from an inner side of a wall member.
Figure 9C:
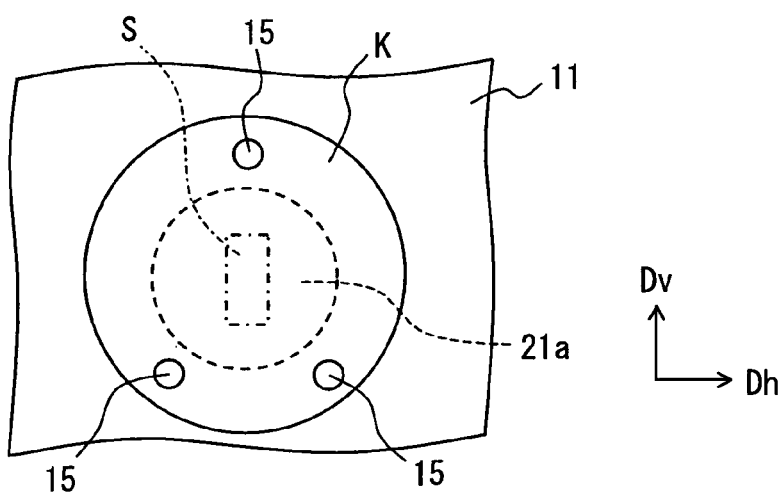
FIG. 9C is a view of the wall member from the inner side.

In the third embodiment shown in FIGS. 9A-9C, a wall member 10 includes three mounting poles 15 extending perpendicular to the inner surface 11 and a ultrasonic sensor 20 includes three mounting holes 28d corresponding to the mounting poles 15.

The mounting member 28 has a circular shape with a center opening where the body 21 of the ultrasonic senor is positioned. The mounting holes 15 are penetrating holes that penetrate the mounting member 28 or recessed holes that do not penetrate the mounting member 28. The mounting poles 15 (holes 28d) are arranged such that a line connecting the mounting poles 15 does not form a regular triangle. For example, the line may form an isosceles triangle. In such an approach, the ultrasonic sensor 20 can be mounted to the wall member 10 in the correct orientation by inserting the mounting poles 15 into or through the mounting holes 28d. Thus, the ultrasonic sensor 20 can be directional in the desired direction. While the ultrasonic sensor 20 is restrained to the mounting location by a combination of the mounting poles 15 and the mounting holes 28d, a fixing surface 28c of the mounting member 28 is bonded to the fixation portion K of the wall member 10 by the adhesive member 30. Thus, the misalignment of the ultrasonic sensor 20 can be prevented so that the variations in characteristics of the ultrasonic sensor 20 can be reduced.

In the wall member 10, mounting pole portions containing the mounting poles 15 have greater thickness than the vibrating surface portion containing the vibrating surface S. As a result, the mounting pole portions have greater stiffness than the vibrating surface portion. Due to the difference in the stiffness, the vibration coming from the vibrating surface S is damped at the mounting pole portions. Thus, the mounting poles 15 can act as not only the mounting location mark but also the vibration dumper.

Further, the mounting poles 15 are viewed even after the ultrasonic sensor 20 is fixed to the wall member 10. Therefore, the ultrasonic sensor 20 can be fixed to the wall member 10 while the mounting poles 15 are viewed. Thus, the ultrasonic sensor 20 can be easily mounted to the wall member 10. Since the ultrasonic sensor 20 is supported by the mounting poles 15 spaced from each other, the ultrasonic sensor 20 can be stably mounted to the wall member 10.

Figure 10:
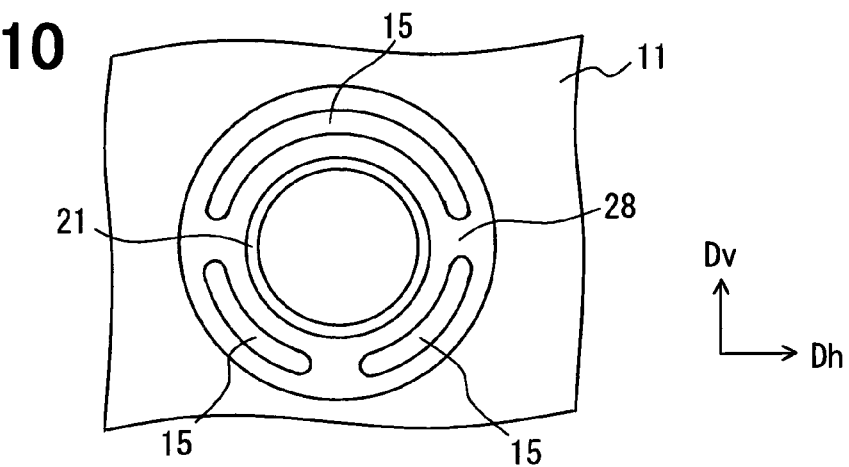
FIG. 10 is a view of an ultrasonic sensor mounting structure according to a modification of the second embodiment from an inner side of a wall member.

As shown in FIG. 10, the mounting poles 15 may be shaped like an ark. In this case, the vibrating surface S (touch portion T) is located inside the area enclosed by the ark-shaped mounting poles 15 so that the vibration is trapped in the area. In such an approach, the ark-shaped mounting poles 15 effectively reduce the vibration transmitted from one ultrasonic sensor 20 to the other so that the reduction in sensitivity and the variation in directivity can be reduced.

Figure 11:
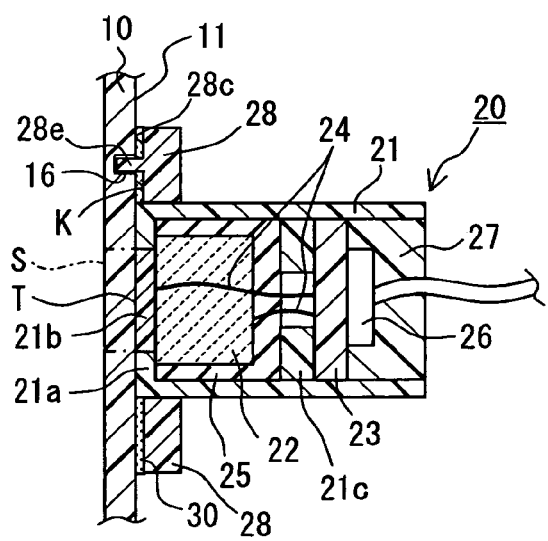
FIG. 11 is a vertical cross-sectional view of an ultrasonic sensor mounting structure according to another modification of the second embodiment.

Alternatively, as shown in FIG. 11, the wall member 10 may include mounting holes 16 and the ultrasonic sensor 20 may include mounting poles 28e extending perpendicular to the fixing surface 28c.

Fourth Embodiment

Figure 12:
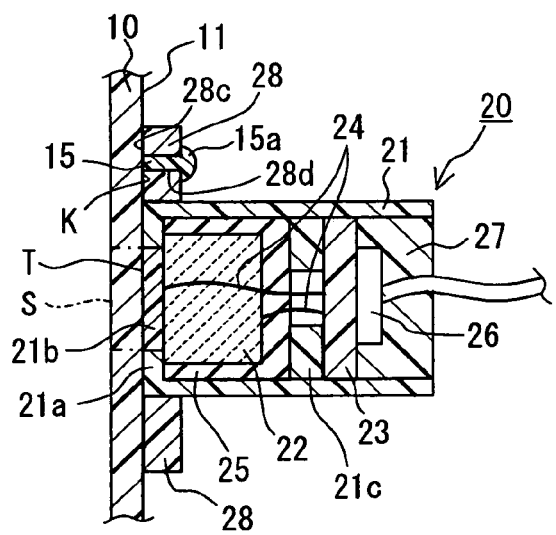
FIG. 12 is a vertical cross-sectional view of an ultrasonic sensor mounting structure according to a fourth embodiment of the present invention.

In the fourth embodiment shown in FIG. 12, a wall member 10 includes mounting poles 15 extending perpendicular to the inner surface 11 and an ultrasonic sensor 20 includes mounting holes 28d. As can be seen by comparing FIG. 9A with FIG. 12, the fourth embodiment shown in FIG. 12 is similar in structure to the third embodiment shown in FIG. 9A. In the forth embodiment, after the mounting poles 15 are inserted through the mounting holes 28d, heat and pressure are applied to top portions 15a of the mounting poles 15. As a result, the top portions 15a are deformed and the mounting member 28 is tightly sandwiched between the top portions 15a and the wall member 10. Thus, the ultrasonic sensor 20 can be securely and easily fixed to the wall member 10 without the adhesive member 30. Alternately, the ultrasonic sensor 20 may be fixed to the wall member 10 by means of a snap fit method or a binding method.

Fifth Embodiment

Figure 13A:
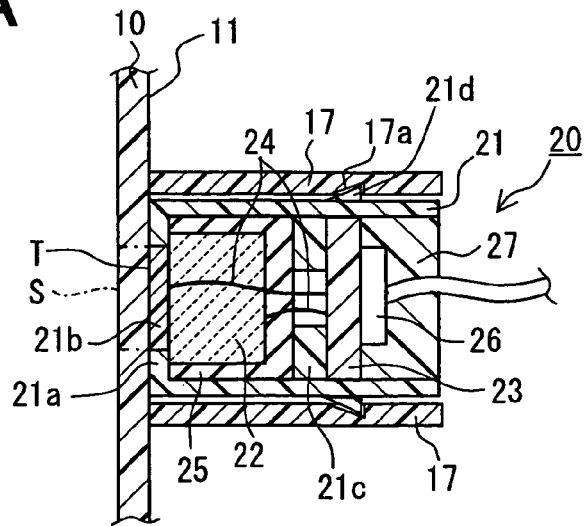
FIG. 13A is a vertical cross-sectional view of an ultrasonic sensor mounting structure according to a fifth embodiment of the present invention.
Figure 13B:
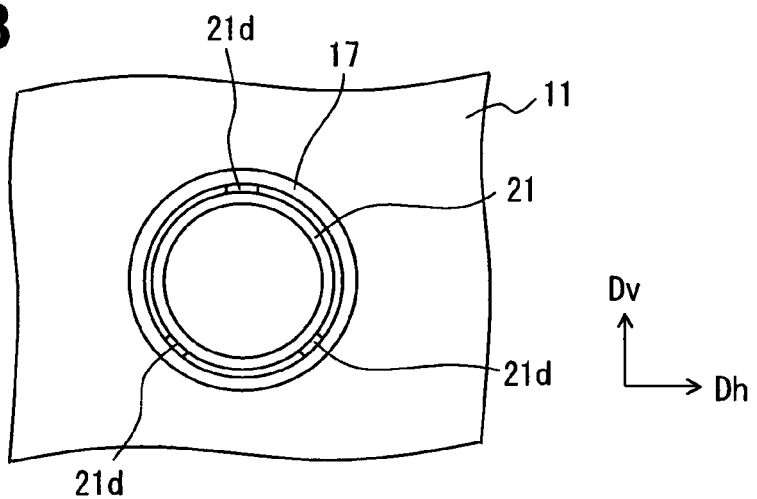
FIG. 13B is a view of the mounting structure of FIG. 13A from an inner side of a wall member.
Figure 13C:
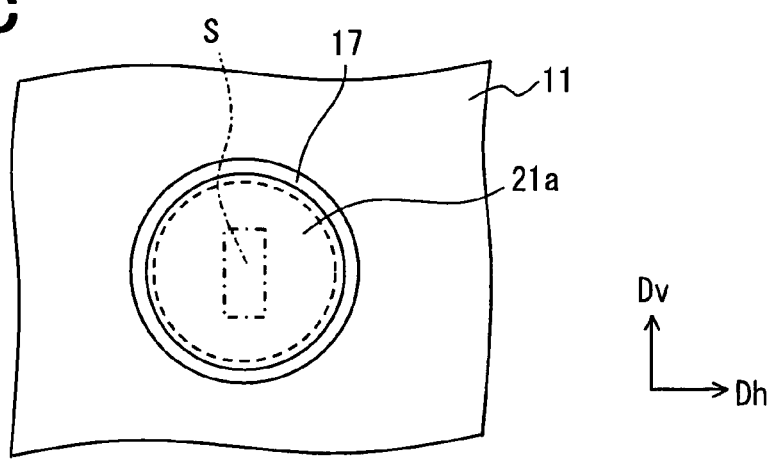
FIG. 13C is a view of the wall member from the inner side.

In the fifth embodiment shown in FIGS. 13A-13C, a wall member 10 includes a hollow cylindrical guide member 17 with three hook receivers 17a and an ultrasonic sensor 20 includes three hooks 21d instead of the mounting member 28. The hooks 21d are engageable with the hook receivers 17a.

The guide member 17 is unitary with or fixedly provided on the wall member 10 to enclose the touch portion T of the inner surface 11. The guide member 17 extends perpendicular to the inner surface 11 along the outer surface of the body 21 to hold the ultrasonic sensor 20. The hooks 21d are provided on the outer surface of the body 21.

The hook receivers 17a (hooks 21d) are arranged such that a line connecting the hook receivers 17a does not form the regular triangle. For example, the line may form the isosceles triangle. In such an approach, the ultrasonic sensor 20 can be mounted to the wall member 10 in the correct orientation by engaging the hooks 21d with the hook receivers 17a. Thus, the ultrasonic sensor 20 can be directional in the desired direction.

When the ultrasonic sensor 20 is inserted into the guide member 17, the hooks 21d are engaged with the hook receivers 17a. Thus, the ultrasonic sensor 20 can be securely and easily mounted to the wall member 10 without the adhesive member 30.

Figure 14:
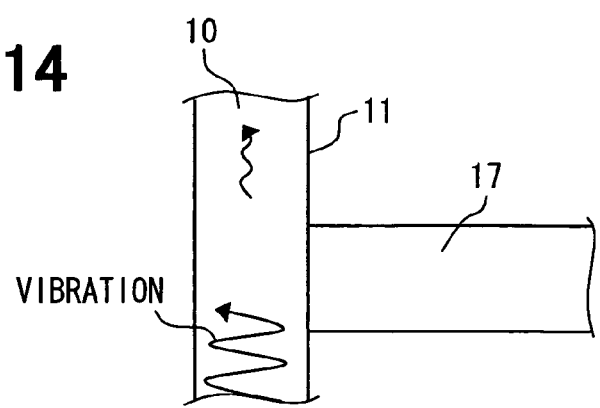
FIG. 14 is a view showing a vibration reduction effect of a guide member of FIG. 13A.

In the wall member 10, guide member portion containing the guide member 17 have greater thickness than the vibrating surface portion containing the vibrating surface S. As a result, the guide member portion has greater stiffness than the vibrating surface portion. Due to the difference in the stiffness, the vibration coming from the vibrating surface S is damped at the guide member portion as shown in FIG. 14. The guide member 17 has the hollow cylindrical shape and encloses the touch portion T. In such an approach, the vibrating surface S is located inside the area enclosed by the guide member 17 so that the vibration is trapped in the area.

Further, since the guide member 17 is positioned close to the touch portion T, the vibration is easily reduced. Thus, the guide member 17 effectively reduces the vibration transmitted from one ultrasonic sensor 20 to the other so that the reduction in sensitivity and the variation in directivity can be reduced. Therefore, the guide member 17 can act as not only the mounting location mark but also the vibration dumper.

Alternatively, the guide member 17 may include the hooks 21d and the ultrasonic sensor 20 may include the hook receivers 17a. At least one set of one hook 21d and one hook receiver 17a is required. The guide member 17 can have various shapes other than the hollow cylindrical shape. For example, the guide member 17 has a shape that allows the vibration mode corresponding to the shape of the vibrating surface S. The ultrasonic sensor 20 may be fixed to the wall member 10 by press fitting into the guide member 17.

The embodiment described above may be modified in various ways. For example, the wall member 10 may be a metal plate used in a vehicle body (e.g. door). The location mark portion such as the recessed line 12 can be provided on any portion of the inner surface 11 except the touch portion T.

The vibration dumper effect may be optional. Therefore, for example, when the ultrasonic sensor 20 is automatically mounted to the wall member 10, the location mark portion such as the recessed line 12 may be just a mark, i.e. have no structure.

The bottom wall 21a may have a projecting portion, instead of the vibration transmission portion 21b, extending to the wall member 10. The vibration is transmitted between the ultrasonic transducer 22 and the wall member 10 through the projecting portion such that the ultrasonic sensor 20 has the directivity.

Such changes and modifications are to be understood as being within the scope of the present invention as defined by the appended claims.

What is claimed is:

1. An ultrasonic sensor mounting structure, comprising:
   an ultrasonic sensor that includes an ultrasonic transducer for generating a vibration and a vibrating surface for emitting the vibration; and
   a wall member having an inner surface and an outer surface opposite to the inner surface, the inner surface having a fixation portion where the ultrasonic sensor is fixed so that the ultrasonic sensor is not visible from the outer surface of the wall member, a touch portion where the ultrasonic transducer directly or indirectly touches so that the vibration generated by the ultrasonic transducer is transmitted to the touch portion, and a location mark portion that defines the fixation portion, the outer surface having a vibration portion positioned corresponding to the touch portion so that the vibration propagates from the touch portion to the vibration portion through the wall member, wherein
   the location mark portion is located outside the touch portion.

2. The mounting structure according to claim 1, wherein the wall member has a first stiffness at the touch portion and a second stiffness at the location mark portion, and the first stiffness is different from the second stiffness.

3. The mounting structure according to claim 2, wherein the location mark portion is a recessed portion recessed in the wall member or a projecting portion projecting from the wall member.

4. The mounting structure according to claim 2, further comprising:
   an adhesive member having a liquid state, wherein
   the location mark portion is an even surface portion that overlaps the fixation portion, and
   the ultrasonic sensor is fixed to the uneven surface portion through the adhesive member.

5. The mounting structure according to claim 3, further comprising:
   an adhesive film, wherein
   the location mark portion is separated from the fixation portion, and
   the ultrasonic sensor is fixed to the fixation portion through the adhesive film.

6. The mounting structure according to claim 3, wherein the fixation portion is bounded by the location mark portion.

7. The mounting structure according to claim 3, wherein the touch portion is enclosed by the location mark portion.

8. The mounting structure according to claim 2, wherein the location mark portion restricts the ultrasonic sensor to one position with respect to the wall member.

9. The mounting structure according to claim 8, wherein the ultrasonic sensor further includes a hole portion, the location mark portion is an extending portion extending toward the ultrasonic sensor, and the extending portion is inserted into or through the hole portion.

10. The mounting structure according to claim 8, wherein the ultrasonic sensor further includes an extending portion extending toward the inner surface of the wall member, the location mark portion is a hole portion, and the extending portion is inserted into or through the hole portion.

11. The mounting structure according to claim 8, wherein the location mark portion is a guide portion extending along an outer surface of the ultrasonic sensor.

12. The mounting structure according to claim 11, wherein the guide portion has a cylindrical shape with a hollow portion where the ultrasonic sensor is received.

13. The mounting structure according to claim 8, wherein the location mark portion locks the ultrasonic sensor in the position.

14. The mounting structure according to claim 1, wherein the location mark portion determines an orientation in which the ultrasonic sensor is fixed to the wall member, and the orientation allows the ultrasonic sensor to have a predetermined directivity.

15. The mounting structure according to claim 14, wherein the location mark portion is one of a plurality of location mark portions, and the location mark portions are arranged to restrain the ultrasonic sensor in the orientation.

16. The mounting structure according to claim 1, wherein the wall member is a bumper of a vehicle.

17. The ultrasonic sensor mounting structure according to claim 1, wherein the touch portion is positioned directly opposite to the vibrating surface.

\* \* \* \* \*